(12) United States Patent
Ahmed et al.

(10) Patent No.: US 10,495,012 B2
(45) Date of Patent: Dec. 3, 2019

(54) VEHICLE THERMAL CONTROL SYSTEM INCLUDING ACTIVE EXHAUST TREATMENT MANAGEMENT

(71) Applicant: GM Global Technology Operations LLC, Detroit, MI (US)

(72) Inventors: Sami Ahmed, Orion Township, MI (US); Michael A. Smith, Clarkston, MI (US); Michelangelo Ardanese, Royal Oak, MI (US); Daniel J. Shepard, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 15/585,589

(22) Filed: May 3, 2017

(65) Prior Publication Data

US 2018/0320617 A1 Nov. 8, 2018

(51) Int. Cl.
*F02D 41/02* (2006.01)
*F01N 3/035* (2006.01)
(Continued)

(52) U.S. Cl.
CPC ......... *F02D 41/0245* (2013.01); *F01N 3/021* (2013.01); *F01N 3/035* (2013.01); *F01N 3/043* (2013.01); *F01N 3/103* (2013.01); *F01N 3/2006* (2013.01); *F01N 3/2066* (2013.01); *F01N 9/00* (2013.01); *F01N 11/002* (2013.01); *F01P 3/02* (2013.01); *F01P 7/167* (2013.01); *F01N 2900/1406* (2013.01); *F01N 2900/1602* (2013.01); *F01N 2900/1606* (2013.01);
(Continued)

(58) Field of Classification Search
CPC ............... F01N 11/002; F01P 2003/021; F01P 2037/00; F01P 3/02; F01D 41/0245
See application file for complete search history.

(56) References Cited

U.S. PATENT DOCUMENTS

| | | | |
|---|---|---|---|
| 2005/0056017 A1* | 3/2005 | Sisken | F02B 37/013 60/605.2 |
| 2013/0133633 A1* | 5/2013 | Yamana | F02D 21/08 123/568.12 |

(Continued)

*Primary Examiner* — Audrey K Bradley
*Assistant Examiner* — Anthony Ayala Delgado
(74) *Attorney, Agent, or Firm* — Cantor Colburn LLP (57) ABSTRACT

An automotive vehicle includes an internal combustion engine that outputs exhaust gas from a cylinder, and an active thermal management system. The active thermal management system flows coolant around the cylinder thereby varying an exhaust temperature of the exhaust gas. An electronic engine controller controls the internal combustion engine and the active thermal management system. The engine controller generates a control signal to selectively operate the active thermal management system in a normal mode, a thermal increase mode, and a thermal decrease mode. The normal mode flows the coolant at a first coolant temperature. The thermal increase mode flows the coolant at a second coolant temperature greater than the first coolant temperature thereby increasing the exhaust temperature of the exhaust gas. The thermal decrease mode flows the coolant at a third coolant temperature less than the first coolant temperature thereby decreasing the exhaust temperature of the exhaust gas.

17 Claims, 10 Drawing Sheets

(51) Int. Cl.
   *F01N 3/20* (2006.01)
   *F01N 11/00* (2006.01)
   *F01P 3/02* (2006.01)
   *F01N 3/04* (2006.01)
   *F01N 3/10* (2006.01)
   *F01N 9/00* (2006.01)
   *F01N 3/021* (2006.01)
   *F01P 7/16* (2006.01)

(52) U.S. Cl.
   CPC ..... *F01P 2003/021* (2013.01); *F01P 2037/00* (2013.01); *F01P 2060/16* (2013.01)

(56) References Cited

U.S. PATENT DOCUMENTS

| | | | |
|---|---|---|---|
| 2014/0020361 A1* | 1/2014 | Warey | F02M 26/50 60/273 |
| 2016/0084184 A1* | 3/2016 | Biagini | F02D 41/1446 60/605.1 |
| 2016/0097336 A1* | 4/2016 | Lee | F02D 41/2422 123/672 |

* cited by examiner

FIG. 10 though the output is not limited to this example.

VEHICLE THERMAL CONTROL SYSTEM INCLUDING ACTIVE EXHAUST TREATMENT MANAGEMENT

BACKGROUND

The subject of the disclosure relates generally to automotive vehicles, and more particularly, to vehicle exhaust treatment systems.

Automotive vehicles include an internal combustion engine that combusts an air/fuel mixture to generate drive torque that drives the vehicle. The vehicle can be installed with an exhaust treatment system which treats exhaust gas produced from the combustion process before expelling the exhaust gas from the vehicle. Some devices included in the exhaust treatment system are heated to a particular activation temperature in order to efficiently treat the exhaust gas. One strategy for heating exhaust treatment devices is to inject a portion of the fuel into the exhaust treatment system and then ignite the fuel. The ignited fuel further increases the temperature of the exhaust gas, which increases the temperature of the exhaust treatment devices(s).

SUMMARY

In at least one non-limiting embodiment, an automotive vehicle comprises an internal combustion engine that outputs exhaust gas from at least one cylinder, and an active thermal management system in fluid communication with the internal combustion engine. The active thermal management system flows coolant around the at least one cylinder thereby varying an exhaust temperature of the exhaust gas. The automotive vehicle further includes an electronic engine controller in signal communication with the internal combustion engine and the active thermal management system. The engine controller generates a control signal to selectively operate the active thermal management system in a normal mode that flows the coolant at a first coolant temperature, and a thermal increase mode that flows the coolant at a second coolant temperature greater than the first coolant temperature thereby increasing the exhaust temperature of the exhaust gas.

According to another non-limiting embodiment, an automotive vehicle comprises an internal combustion engine that outputs exhaust gas from at least one cylinder, and an active thermal management system in fluid communication with the internal combustion engine. The active thermal management system flows coolant around the at least one cylinder thereby varying an exhaust temperature of the exhaust gas. The automotive vehicle further includes an electronic engine controller in signal communication with the internal combustion engine and the active thermal management system. The engine controller generates a control signal to selectively operate the active thermal management system in a normal mode that flows the coolant at a first coolant temperature, and a thermal decrease mode that flows the coolant at a second coolant temperature less than the first coolant temperature thereby decreasing the exhaust temperature of the exhaust gas.

In yet another non-limiting embodiment, a method of controlling an active thermal management system of a vehicle comprises outputting exhaust gas from at least one cylinder of an internal combustion engine included in the vehicle. The method further includes flowing coolant around the at least one cylinder to vary an exhaust temperature of the exhaust gas. The method further includes operating the active thermal management system in a normal mode that flows the coolant at a first coolant temperature based on a first operating parameter. The method further includes operating the active thermal management mode in a thermal increase mode that flows the coolant at a second coolant temperature greater than the first coolant temperature based on a second operating parameter thereby increasing the exhaust temperature of the exhaust gas.

Various features are readily apparent from the following detailed description when taken in connection with the accompanying drawings.

BRIEF DESCRIPTION OF THE DRAWINGS

Other features, and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Various non-limiting embodiments described herein include a vehicle thermal control system that provides active exhaust treatment management. The vehicle thermal management control system controls coolant flow in a coolant circuit to adjust the temperature of the exhaust gas output from the engine. In this manner, the thermal management control system minimizes fuel consumption during various after treatment processes such as, for example, filter regeneration events. The thermal management control system is also configured to control coolant flow to actively reduce exhaust gas temperature output from the engine. Accordingly, the temperature of various aftertreatment devices, such as an SCR device for example, can be rapidly reduced and/or maintained at lower device temperatures.

Figure 1:
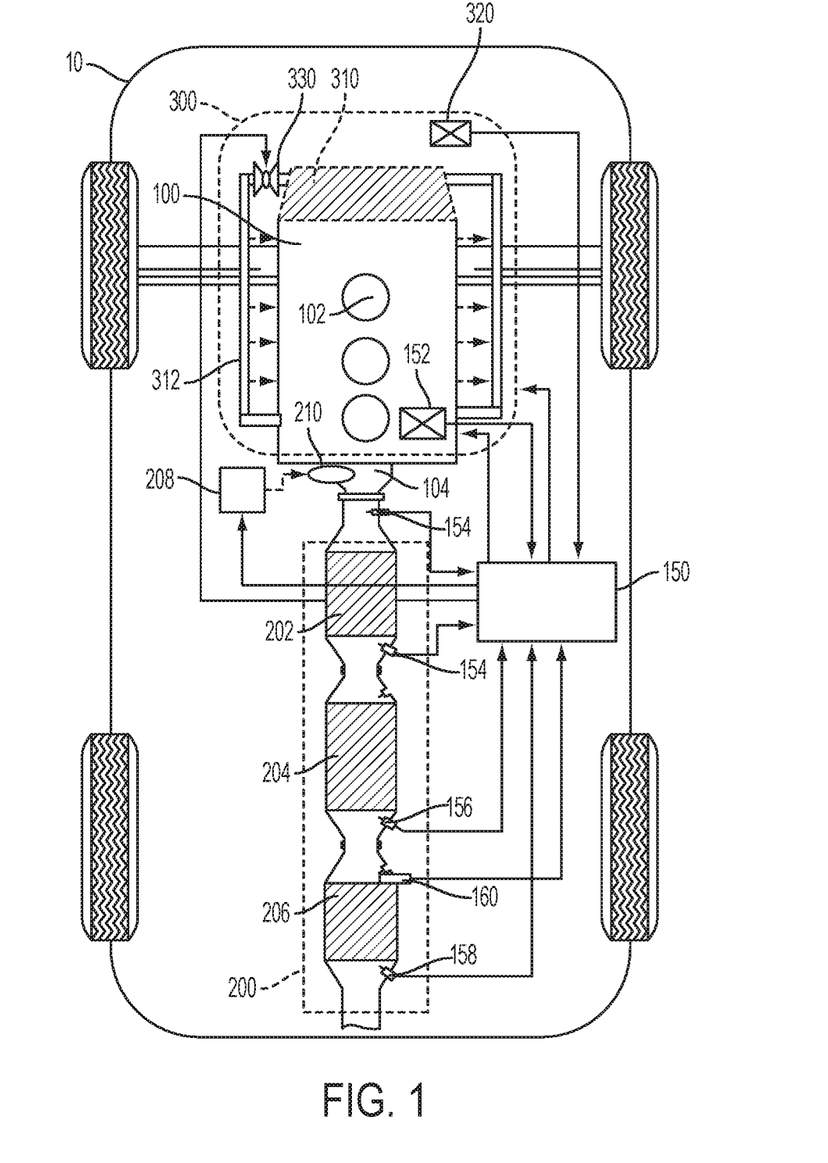
FIG. 1 is a schematic diagram of a vehicle including an active thermal control system according to a non-limiting embodiment.

Referring now to FIG. 1, a vehicle 10 includes an engine 100, an electronic engine controller 150, an exhaust gas treatment system 200 and an active thermal control system 300. The engine 100 may include, but is not limited to, a diesel engine, gasoline engine, a homogeneous charge compression ignition engine, and a hybrid engine system including an engine that operates along with an electric motor. In addition, any of the aforementioned engine systems can be used in conjunction with the exhaust gas treatment system 200 described herein. The engine 100 includes at least one cylinder 102 to combust fuel therein. An exhaust gas conduit 104 conveys exhaust gas, which is generated in response to combusting the fuel in the cylinder 102, to the exhaust gas treatment system 200.

The exhaust gas treatment system 200 includes a first oxidation catalyst ("OC") device 202, a selective catalytic reduction ("SCR") device 204, and a particulate filter ("PF") device 206. In at least one exemplary embodiment of the disclosure, the PF device 206 is a diesel particulate filter. It is appreciated that the exhaust gas treatment system 200 of the disclosure may include various combinations of one or more of the aftertreatment devices shown in FIG. 1, and/or other aftertreatment devices (e.g., lean $NO_x$ traps), and is not limited to the present example.

The first OC device 202 may include, for example, a flow-through metal or ceramic monolith substrate that is packaged in a stainless steel shell or canister having an inlet and an outlet in fluid communication with exhaust gas conduit. The substrate may include an oxidation catalyst compound disposed thereon. The oxidation catalyst compound may be applied as a wash coat and may contain platinum group metals including, but not limited, to platinum ("Pt"), palladium ("Pd"), rhodium ("Rh") or other suitable oxidizing catalysts, or combinations thereof. The OC device 202 may treat unburned gaseous and non-volatile HC and CO, which are oxidized to form carbon dioxide ($CO_2$) and water ($H_2O$).

The SCR device 204 may be disposed downstream from the first OC device 202. The SCR device 204 may include, for example, a flow-through ceramic or metal monolith substrate that may be packaged in a stainless steel shell or canister having an inlet and an outlet in fluid communication with the exhaust gas conduit. The substrate may include an SCR catalyst composition applied thereto. The SCR catalyst composition may contain a zeolite and one or more base metal components including, but not limited to, ("Fe"), cobalt ("Co"), copper ("Cu") or vanadium ("V") which may operate efficiently to convert $NO_x$ constituents of the exhaust gas in the presence of a reductant.

For instance, a dosing system includes a reductant supply 208 that stores a reductant (e.g., urea) and a fluid injector 210 that injects the reductant into the exhaust gas stream. The reductant is then absorbed onto the SCR catalyst of the SCR device 204. When the SCR catalyst reaches an activation temperature (e.g., approximately 200° C.), the stored reductant (e.g., ammonia) is utilized to convert the NOx in the exhaust gas to other molecules, e.g., nitrogen ($N_2$), and water ($H_2O$) by methods understood by one of ordinary skill in the art.

The PF device 206 may be disposed downstream from the SCR device 204, and filters the exhaust gas of carbon and other particulate matter. According to at least one exemplary embodiment, the PF device 206 may be constructed using a ceramic wall flow monolith exhaust gas filter substrate that is wrapped in an intumescent or non-intumescent mat (not shown) that expands, when heated to secure and insulate the filter substrate which is packaged in a rigid, heat resistant shell or canister, having an inlet and an outlet in fluid communication with exhaust gas conduit. It is appreciated that the ceramic wall flow monolith exhaust gas filter substrate is merely exemplary in nature and that the PF device 206 may include other filter devices such as wound or packed fiber filters, open cell foams, sintered metal fibers, etc.

Exhaust gas entering the PF device 206 is forced to migrate through porous, adjacently extending walls, which capture carbon and other particulate matter from the exhaust gas. Accordingly, the exhaust gas is filtered prior to being exhausted from the vehicle tailpipe. As exhaust gas flows through the exhaust gas treatment system 200, the PF device 206 realizes a pressure across the inlet and the outlet. The amount of particulates captured by the PF device 206 increases over time, thereby increasing the exhaust gas backpressure realized by the engine 100. Accordingly, a regeneration process can be performed to regenerate the PF device 206. In at least one embodiment, the regeneration operation includes increasing the temperature of the exhaust gas to a combustion temperature (e.g., approximately 500° C.) which induces combustion of the particular matter and carbon soot collected in the PF device 206. The combustion temperature necessary to properly regenerate the PF device 206 is typically greater than the SCR catalyst activation temperature, and can range, for example, from approximately 350 degrees Celsius (° C.) to approximately 650° C. or greater.

The engine controller 150 is operably connected to and monitors the engine 150 and the exhaust gas treatment system 200 based on outputs from a number of sensors. In at least one embodiment, the sensors include an engine block temperature sensor 152 to determine a temperature of the engine 100, one or more OC sensors 154 to determine a temperature profile of the OC device 202, one or more SCR sensors 156 to determine a temperature profile of the SCR device 204, and one or more PF sensors 158 to determine a temperature profile of the PF device 206. In at least one embodiment, the control module 150 controls operation of the engine 100 based on information provided by one or more of the sensors 152-158. It should be appreciated that more or less sensors can be employed to determine the various temperatures described herein.

In addition to the temperature sensors 152-158, the exhaust gas treatment system 200 may further include at least one pressure sensor 160 (e.g., a delta pressure sensor), in electrical communication with the engine controller 150. The pressure sensor 160 is coupled to the PF device 206 and outputs a signal indicative of a pressure profile across the PF device 206. Although a single pressure sensor 160 is illustrated, it should be appreciated that an inlet pressure sensor (not shown) and an outlet pressure sensor (not shown) may be employed to determine a pressure differential across the inlet and outlet of the PF device 206.

The engine controller 150 is also in signal communication with the active thermal control system 300. The active thermal control system 300 includes a radiator unit 310, a coolant circuit 312, one or more coolant sensors 320, and one or more coolant valves 330. The radiator unit 310 and coolant circuit 312 work in conjunction to deliver coolant through the engine block to surround the cylinders 102. Any type of liquid coolant capable of acting as a heat transfer medium may be implemented in the active thermal control system 300. The heat of the combusted exhaust gas is transferred to the coolant surrounding the exterior of the cylinder 102. As the heat is absorbed by the coolant, the temperature of exhaust gas within the cylinder 102 is cooled thereby cooling the cylinders 102 and the engine 100. The heated coolant is then returned to the radiator 310 where it is cooled. The cooled coolant is then recirculated back to the engine 100 where the process is repeated. The initial temperature entering the engine 100 (i.e., the engine block) can influence the amount of heat which is to be absorbed from the cylinders 102. Thus, coolant having a low first fluid temperature entering the engine 100 will absorb more heat, and will lower the temperature of the exhaust gas more than coolant having a higher second fluid temperature entering the engine 100 compared to the low first fluid temperature.

One or more of the coolant valves 330 can be adjusted between an open position and a closed position to control the flow of coolant through one or more flow paths of the coolant circuit 312 based on an electrical signal output from the engine controller 150. The valves 330 include an internal movable member (not shown) that can be controlled by the controller 150 to establish different positions. In this manner, the engine controller 150 is capable of actively varying the exhaust gas temperature contained in a cylinder 102 by controlling the coolant valve 330.

For instance, the engine controller 150 can output a signal that adjusts a position of one or more coolant valves 330 so as to control the flow of coolant to different portions of the cooling circuit 312, thereby actively adjusting the coolant temperature of the coolant. In turn, the coolant can be flowed around the cylinders 102 at different temperatures, thereby actively varying the exhaust temperature is output from engine 100. In this manner, the exhaust gas can be delivered to the exhaust gas treatment system 200 at different temperature so to perform different exhaust treatment operations including, but not limited to, increasing the temperature of the SCR device 204 to achieve the SCR active temperature threshold, decreasing the temperature of the SCR device 204, and/or increasing the temperature of the PF catalyst to a combustion temperature threshold so as to regenerate the PF device 206 as described herein. In addition, the active thermal control system 300 increases exhaust temperature control response time without injecting additional fuel into the exhaust treatment system. Accordingly, exhaust gas temperatures can be actively controlled to mitigate or even prevent SCR conversion loss without wasting fuel, thereby improving overall fuel efficiency of the vehicle 10. In a similar manner, the engine controller 150 can control the coolant valves 330 to decrease the temperature of the exhaust gas contained in the cylinders 102.

Figure 2:
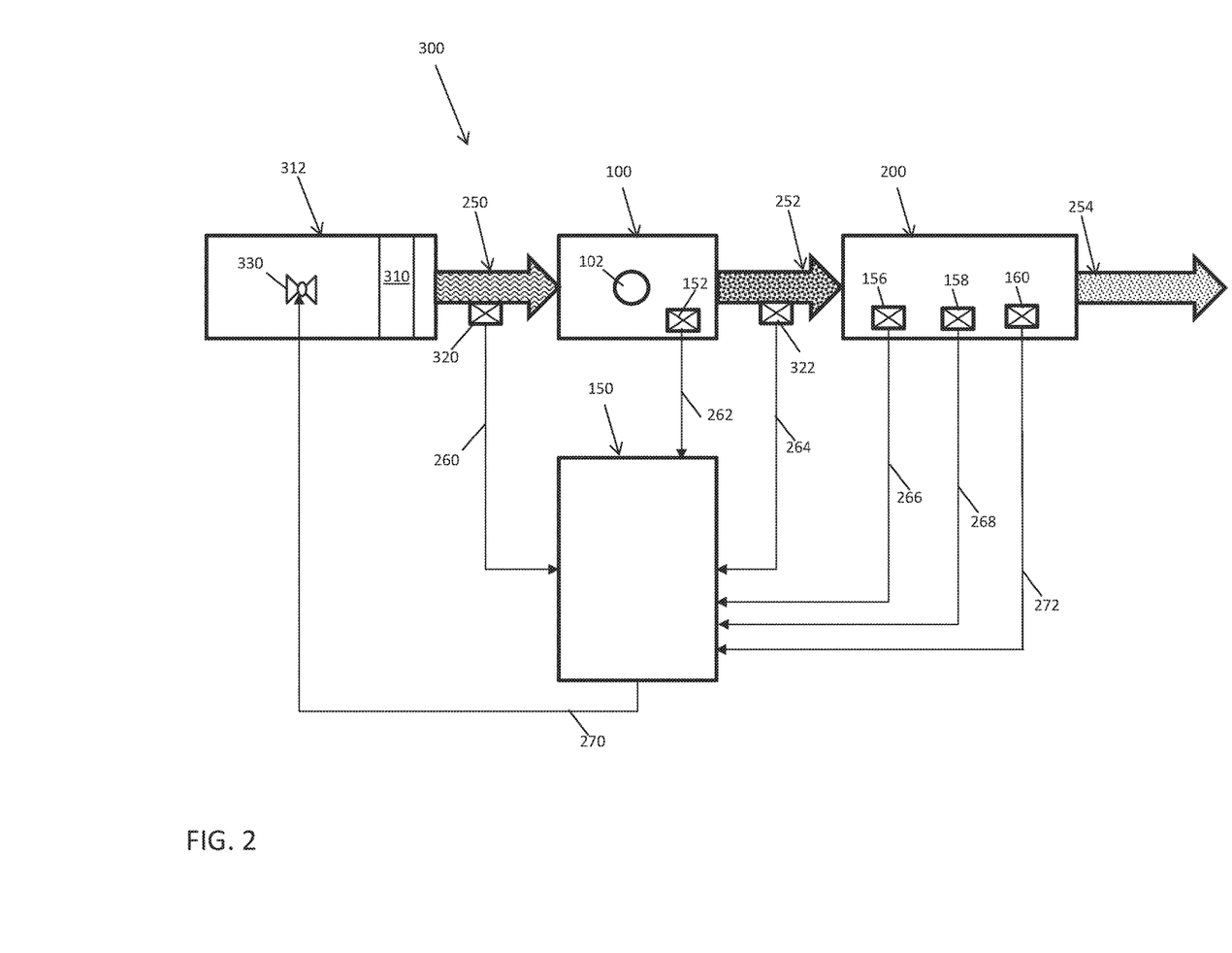
FIG. 2 is a block diagram illustrating operation of an active thermal control system according to a non-limiting embodiment.

With reference to FIG. 2, a general operation of an active thermal control system 300 is illustrated according to a non-limiting embodiment. The radiator unit 310 and coolant circuit 312 work in conjunction to deliver coolant 250 through the engine 100 (i.e., engine block) and around the cylinders 102. Heated exhaust gas 252 is passed to the exhaust gas treatment system 200 where it is treated using one or more exhaust treatment devices (e.g., OC device 202, SCR device 204, PF device 206, etc.). Treated exhaust gas 254, having lower particular levels and NOx emissions, is output from the exhaust treatment system 200.

The engine controller 150 is in signal communication with one or more coolant temperature sensors 320, engine block temperature sensor 152, one or more exhaust gas temperature sensors 322, the SCR temperature sensor 156, and the PF temperature sensor 158. The coolant sensors 320 output an electrical coolant temperature signal 260 indicating a temperature of the coolant flowing at various stages and flow paths of the coolant circuit 312. The engine block temperature sensor 152 outputs an electrical block temperature signal 262 indicating a temperature of the engine 100. The exhaust gas temperature sensors 322 outputs an electrical exhaust temperature signal 264 indicating a temperature of the exhaust gas flowing at various stages and flow paths of the vehicle 10. For instance, a first exhaust gas temperature sensor can indicate the temperature of the exhaust gas exiting the cylinder 102 while a second exhaust gas temperature sensor can indicate the temperature of the treated exhaust gas exiting the exhaust gas treatment system 200. The SCR temperature sensor 156 outputs an electrical SCR temperature signal 266 indicating a temperature associated with the SCR device 204. The PF temperature sensor 158 outputs an electrical PF temperature signal 268 indicating a temperature associated with the PF device 206. It should be appreciated that more or fewer sensors can be included in the active thermal control system 300.

The engine controller 150 can transition the active thermal control system 300 between a normal mode and a thermal increase mode. During operation, the engine controller 150 monitors the temperature of the SCR device 204 via the SCR temperature sensor 156 and the PF device 206 via the PF temperature sensor 158. With respect to the SCR device 204, for example, the engine controller 150 is programmed with an SCR activation temperature set point value (e.g., about 200° C.). When the SCR temperature indicated by the SCR temperature sensor 156 exists at the SCR activation set point value (or an acceptable activation temperature range), the engine controller 150 maintains a current normal operation of the coolant flow.

When, however, the SCR temperature indicated by the SCR temperature sensor 156 falls below the SCR activation set point value, the engine controller 150 initiates a thermal increase mode of the active thermal control system 300 by outputting an electrical coolant valve control signal 270 that adjusts the position of one or more coolant valves 330, and in turn modifies the flow of coolant flowing through various flow paths of the coolant circuit 312. For example, the coolant valve control signal 270 can adjust a chamber of the main rotary valve 330 such that no coolant 250 is delivered to the radiator 310 and thus no heat is removed from the coolant 250. As a result, heated coolant is recirculated back into the coolant circuit 312.

Figure 3:
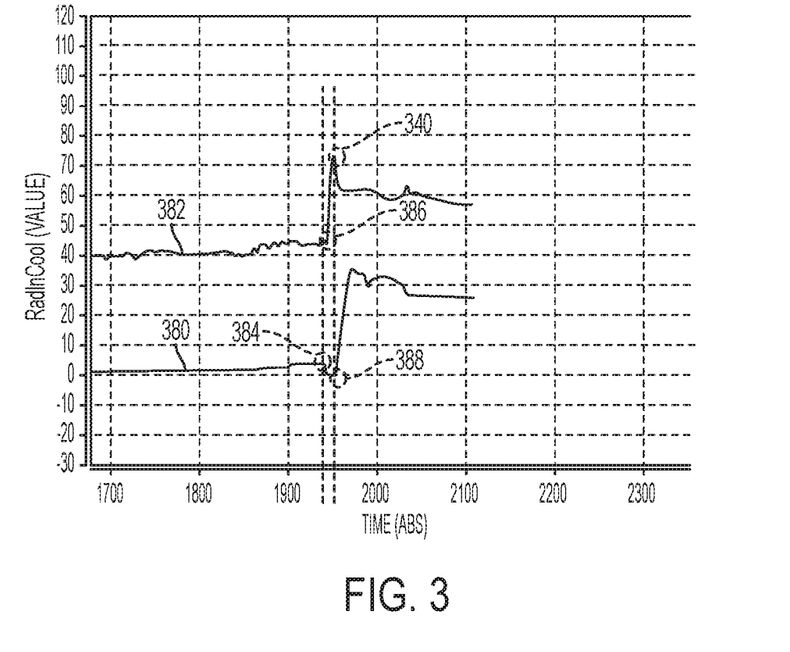
FIG. 3 is a graph illustrating a correlation between a decrease in the radiator output temperature and an increase in the overall system temperature.

The correlation between the decrease in the radiator output temperature and the increase in the overall system temperature is illustrated in FIG. 3. For instance, signal 380 indicates the output temperature of the radiator 310 while signal 382 indicates the inlet temperature of the radiator 310. When the radiator outlet temperature decreases at point 384 the overall temperature of the system begins increasing at point 386 thereby delivering warmer coolant 250. As illustrated, when the coolant 250 is again delivered to the radiator 310 such that the radiator outlet temperature increases at point 388, the radiator inlet temperature decreases at point 340 indicating that the overall temperatures of the engine 100 and the coolant circuit 312 have decreased.

Referring again to FIG. 2, because the engine 100 receives by-passed coolant 250 having an increased temperature, less heat from the cylinders 102 is transferred to the coolant 250. As a result, the exhaust treatment system 200 receives higher temperature exhaust gas 252 compared to the temperature of the exhaust gas 252 received when the active thermal control system 300 operates in the normal mode. The higher exhaust gas temperature increases the temperature of the SCR device 204. Once the SCR temperatures signal 266 indicates that the SCR device 204 is at the activation set point value, the engine controller 150 outputs a valve control signal 270 to adjust one or more coolant valves 330 to reduce the temperature of the coolant 250 thereby returning the active thermal control system 300 to the normal cooling mode.

The descriptions above refer to the SCR device 204, but it should be appreciated that the active thermal control system 300 can be controlled in a similar manner to initiate regeneration of the PF device 206. For instance, The PF temperature sensor 158 outputs an electrical PF pressure signal 272 indicating a pressure associated with the PF device 206, and the engine controller 150 is programmed with a PF pressure set point value. A measured pressure value that exceeds the PF pressure set point indicates that particular matter load of the PF filter exceeds a predetermined threshold value.

During operation, the engine controller 150 monitors the pressure of the PF device 206 via the PF pressure sensor 160. When the PF pressure indicated by the PF pressure sensor 160 exists at an acceptable pressure set point (or an acceptable pressure range), the engine controller 150 maintains the active thermal control system 300 in a normal cooling mode (see FIG. 6).

Figure 7:
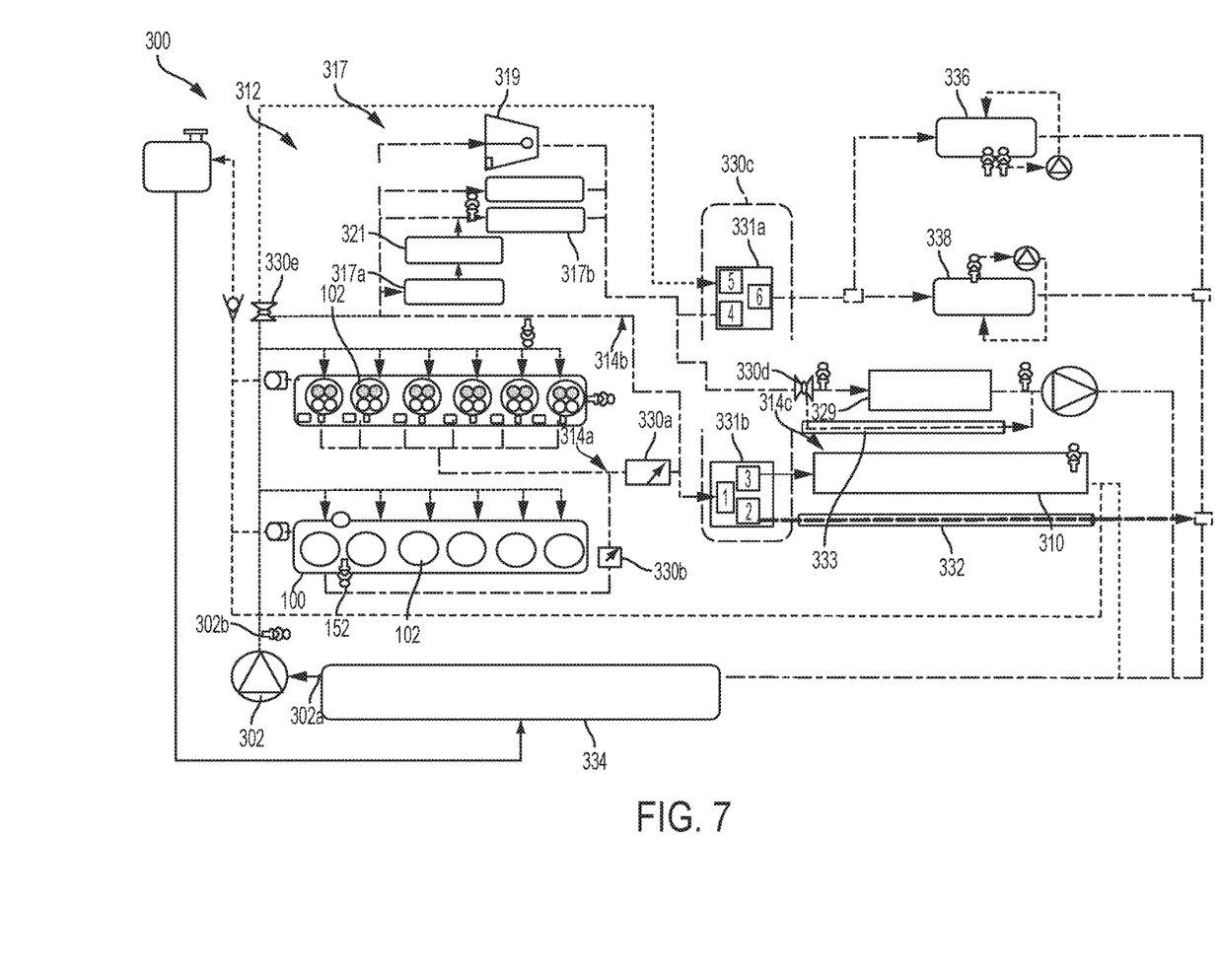
FIG. 7 is a diagram illustrating coolant flowing in the active thermal control system during an increased temperature operating mode according to a non-limiting embodiment.

When, however, the PF pressure indicated by the PF pressure sensor 160 exceeds the pressure set point value, the engine controller 150 initiates a thermal increase mode of the active thermal control system 300 (see FIG. 7). The thermal increase mode is invoked by outputting an electrical coolant valve control signal 270 that adjusts the position of one or more coolant valves 330. Accordingly, the flow of coolant 250 through various flow paths of the coolant circuit 312 is modified and the exhaust treatment system 200 receives exhaust gas 252 having a higher temperature compared to the temperature of the exhaust gas 252 received when the active thermal control system 300 is operating in the normal mode. The increased exhaust gas temperature increases the temperature of the PF device 206 to achieve a combustion temperature (e.g., approximately 500° C.) which induces combustion of the particular matter and carbon soot collected in the PF device 206. The PF matter and soot is burned-off such that the PF device 206 is regenerated.

Figure 8:
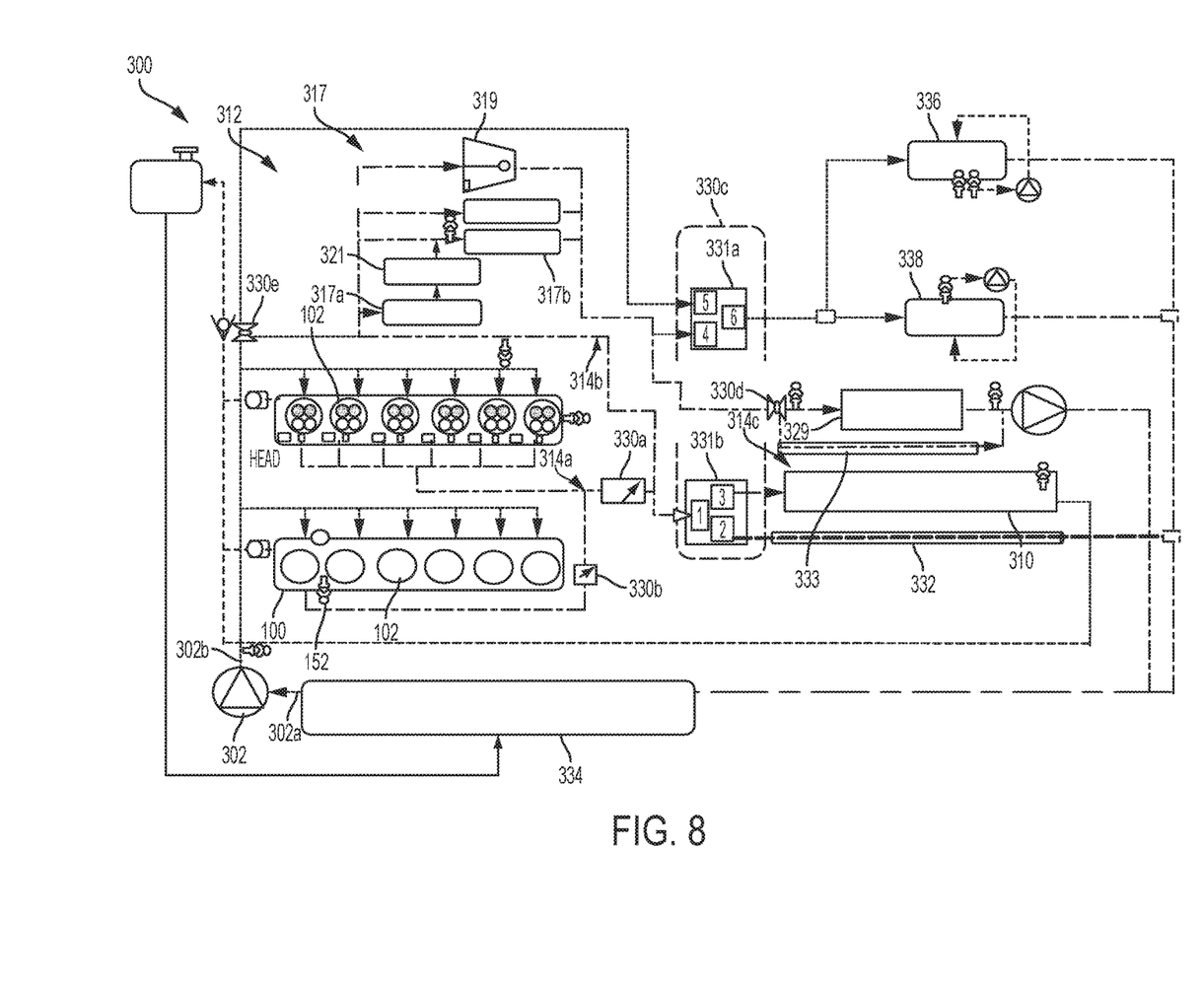
FIG. 8 is a diagram illustrating coolant flowing in the active thermal control system during a decreased temperature operating mode according to a non-limiting embodiment.

The operations described above may also be executed in a similar manner to transition the active thermal control system 300 between a normal operating mode and a thermal decrease mode (see FIG. 8). For example, the treatment system 200 does not instantaneously return to its normal operating temperature following regeneration of the PF device 206. With this in mind, the engine controller 150 operates to monitor the PF temperature following a regeneration event and can invoke a thermal decrease mode to more quickly reduce the temperature of the treatment system 200 as discussed in greater detail below.

Once the PF pressure signal 272 indicates that the PF pressure has returned to an acceptable pressure value (or pressure range), the engine controller 150 outputs a valve control signal 270 to adjust one or more coolant valves 330 to increase an amount of coolant 250 delivered to the heater core and/or the radiator 310. By delivering a greater amount of coolant 250 to the radiator 310, for example, the coolant 250 is rapidly cooled, and thus the exhaust gas temperature is quickly decreased. Accordingly, the exhaust treatment system 200, including the PF device 206, can return to its normal operating state more quickly compared to passively allowing the exhausting treatment system 200 to cool. This concept can also be used when SCR temperature indicated by the SCR temperature sensor 156 exceeds a calibrated threshold temperature. In this event, the engine controller 150 can control the coolant valves 330 to modify the coolant flow and quickly reduce the temperature of the SCR device 204. In addition, rapidly reducing the SCR temperature and/or maintaining a lower SCR temperature allows the SCR device 204 to more quickly achieve ideal reductant storage capacity temperatures.

Figure 4:
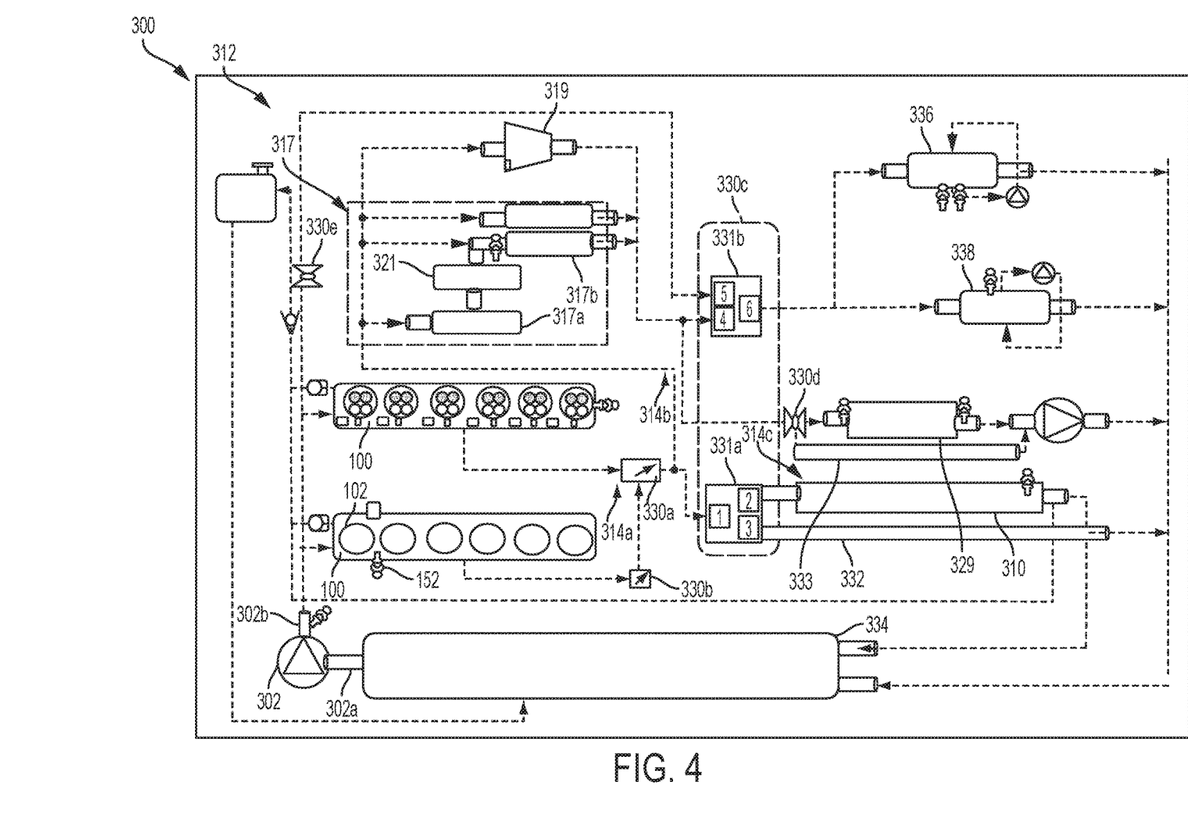
FIG. 4. is a diagram of an active thermal control system absent any coolant flow behavior according to a non-limiting embodiment.

Turning now to FIG. 4, the available flow paths of an active thermal control system 300 is illustrated in greater detail according to a non-limiting embodiment. The active thermal control system 300 includes a coolant pump 302 that works to flow coolant through several flow paths that define the coolant circuit 312. The flow paths include a high-engine flow path 314*a*, a low-engine flow path 314*b*, and a null flow path 314*c*. In at least one embodiment, the combined operation of valves 330*a*, 330*b*, and 331*a*, for example, disable/enable flow paths 314*a*-314*c*.

The pump 302 has an inlet 302*a* and an outlet 302*b*, and can be driven by the engine 100. Coolant flow through the one or more fluid paths 314 of the coolant circuit 312 is controlled by multiple valves 330*a*-330*n*, according to the operation of the engine controller 150, to establish different cooling flow modes, i.e., thermal control system modes. At least one of the coolant paths delivers coolant through the engine 100 (i.e., the engine block) and around the exterior surface of the cylinders 102.

The coolant valves 330*a*-330*n* include, but are not limited to, a coolant flow control valve (FCV) 330*a*, an engine block valve 330*b*, a main rotary valve 330*c*, a heater core bypass valve 330*d*, and an exhaust gas recirculation (EGR) by-pass valve 330*e*. The FCV 330*a* has a FCV inlet in fluid communication with one or more engine block coolant outlets, and a FCV outlet in fluid communication with the main rotary valve 330*c*, an EGR sub-system 317, and a turbocharger sub-system 319. The FCV outlet receives heated coolant output from the engine 100 and splits the heated coolant into individual flow paths that are delivered to the main rotary valve 330*c*, the EGR sub-system 317, and the turbo sub-system 319. The main rotary valve 330*c* includes a first chamber 331*a* and a second chamber 331*b*. Each of the chambers 331*a* and 331*b* are controlled by the engine controller 150 to adjust the output of coolant from the main rotary valve 330*c* as described in greater detail below.

The EGR sub-system 317 is configured to recirculate a portion of the exhaust gas in succession through a first heat exchanger 317*a*, also referred to as a high-temperature (HT) EGR 317*a*, and a second heat exchanger 317*b*, also referred to as a low-temperature (LT) EGR 317*b*. An EGR valve 321 can be provided to control the recirculation flow. In at least one embodiment, the pump 302 delivers coolant in parallel paths through the HT EGR cooler 317*a* and the LT EGR 317*b*. The outlets of the HT EGR 317*a* and the LT EGR 317*b* are in fluid communication with the main rotary valve 330*c*. The EGR by-pass valve 330*e* can be controlled to allow a portion of the cooled coolant to by-pass the EGR sub-system 317 and turbocharger system 319. In this manner low temperature coolant can be delivered directly to the main rotary valve 330*c*.

The turbocharger sub-system 319 can include an air compressor (not shown) and a turbocharger heat exchanger (not shown). The turbocharger sub-system 319 operates by recovering exhaust energy via a turbine, which powers a compressor to increase the mass of air provided to each combustion cylinder 102. The compressed air temperature is elevated in the process. The turbocharger-system 319 can also include a turbocharger cooler to increase operating efficiency of the turbocharger sub-system 319. The turbocharger cooler works to decrease the temperature, thereby further increasing the density of air provided to each cylinder 201. In at least one embodiment, the active thermal management system 100 is capable of controlling the turbocharger-sub system 319 such that the turbocharger-sub system 319 (e.g., the turbocharger cooler) is utilized to increase the air density in the intake system and/or is utilized as a heat exchanger to manipulate the overall temperature of the coolant flowing through the coolant circuit 312.

In at least one embodiment, the engine block valve 330b is disposed upstream from the main rotary valve 330c. The inlet of the engine block valve 330b is in fluid communication with the engine block coolant outlets, while the outlet of the engine block valve 330b is in fluid communication with the FCV 330a. Accordingly, the total amount of high temperature coolant delivered from the engine 100 to the FCV 330a can be actively regulated. For example, the majority, if not the full amount, of high temperature coolant output from the engine 100 can be delivered to the FCV 330a when the engine block valve 330b is fully opened. As the engine block valve 330b is transitioned into a closed position, the amount of high temperature coolant delivered from the engine 100 to the FCV 330a is reduced. When the engine block valve 330b is fully closed, the FCV 330a receives only a partial amount (e.g., half) of the high temperature coolant output from the engine 100.

The main rotary valve 330c includes a first chamber 331a and a second chamber 331b. In at least one embodiment, the first chamber 331a is configured as a single inlet-dual outlet chamber, while the second chamber 331b is configured as a dual inlet-single outlet chamber.

With respect to the first chamber 331a, the single inlet (1) is in fluid communication with an outlet of the FCV 330a. A first outlet (2) of the first chamber 331a is in fluid communication with an inlet of the radiator 310 while a second outlet (3) is in fluid communication with a radiator by-pass conduit 332. The first chamber 331a is selectively operated via the engine controller 150 to control the amount of coolant delivered to the radiator 310. For instance, opening the first outlet (2) while closing the second outlet (3) delivers the full amount of heated coolant entering the single inlet (1) to the radiator 310. In turn, the radiator 310 removes the heat from the coolant, and low temperature coolant is output therefrom where it delivered to the return conduit 334 and returned to the pump 302. This coolant flow control delivers reduced coolant flow temperatures around the cylinders 102 thereby causing the temperature of the exhaust gas to decrease.

Conversely, closing the first outlet (2) while opening the second outlet (3) delivers the full amount of high temperature coolant entering the single inlet (1) to the by-pass conduit 332 such that the heated coolant completely by-passes the radiator 310. The coolant delivered to the by-pass conduit 332 is then delivered directly to the return conduit 334 which returns the heated coolant to the pump 302. This coolant flow control delivers increased coolant flow temperatures around the cylinders 102 thereby causing the exhaust gas temperature to increase.

Figure 5:
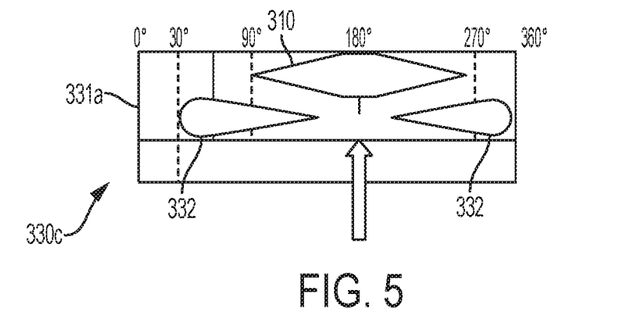
FIG. 5 is a radial position diagram illustrating the rotational position of a first chamber of a main rotary valve with respect to an amount of coolant delivered to a radiator according to a non-limiting embodiment.

In at least one embodiment, the chambers 331a and 331b can be rotated such that the openings of the dual inlets or dual outlets are adjusted with respect to one another. Referring to FIG. 5, for example, a radial position diagram maps the rotational position of the first chamber 331a with respect to the amount of coolant delivered to the radiator 310. Placing the first chamber 331a at an initial reference position of about 0° essentially deactivates the chamber 331a and prevents coolant from exiting both the first outlet (2) and the second outlet (3). Conversely, rotating the first chamber 331a to a position of about 180° with respect to the initial reference position (i.e.,0°) closes the second outlet 3 while fully opening the first outlet (2) and outputs a full amount of coolant to the radiator 310. Rotating the first chamber 331a to a position between about 30° and about 90° or to a position between about 270° and about 360° closes the first outlet 2 while fully opening the second outlet (3). In this manner, the full amount of coolant is delivered to the by-pass conduit 332 thereby by-passing the radiator 330. As can be appreciated in view of a radial position diagram map shown in FIG. 5, the first chamber 331a can be rotated to any position between about 90° and about 270° to precisely control the amount of coolant delivered to the radiator 330 and/or the by-pass conduit 332.

With respect to the second chamber 331b, a first inlet (4) is in fluidcommunication with the outlets of the EGR sub-system 317 and the turbocharger sub-system 319 to receive high temperature coolant. A second inlet (5) is in fluid communication with the pump outlet 302b to receive low temperature coolant. The single outlet (6) is in fluid communication with an engine oil sub-system 336 and a transmission oil subsystem 338. The engine oil sub-system 336 can include an engine oil-pump (not shown) and an engine oil heat exchanger (not shown). The transmission oil sub-system 338 can include a transmission oil pump (not shown) and a transmission oil heat exchanger (not shown).

The second chamber 331b is selectively operated via the engine controller 150 to either warm or cool the engine oil heater 336 and the transmission oil heater 338. Opening the first inlet (4) while closing the second inlet (5) outputs high temperature coolant from the single outlet (6) to heat the engine oil heater 336 and the transmission oil heater 338. Conversely, closing the first inlet (4) while opening the second inlet (5) outputs low temperature coolant from the single outlet (6) to cool engine oil heater 336 and the transmission oil heater 338. Each of the inlets (4) and (5) can be controlled by the engine controller 150 as described herein.

Similar to the first chamber 331a, the second chamber 331b can be rotated such that the opening of the first inlet 4 can be adjusted with respect to the opening of the second inlet 5. Placing the second chamber 331b at an initial reference position of about 0° essentially deactivates the second chamber 331b and prevents coolant from entering both the first inlet 4 and the second inlet 5. Rotating the second chamber 331b to a position of about 180° with respect to the initial reference position (i.e., 0°) closes the second inlet 5 and outputs a full amount of high temeprature coolant to the engine oil sub-system 336 and the transmission oil sub-system 338 via the outlet 6. Conversely, rotating the second chamber 331b to a position between about 30° and about 90° or to a position between about 270° and about 360° closes the first inlet 4 while fully opening the second inlet 5. In this manner, low temperature coolant output directly from the pump 302 is delivered to the engine oil sub-system 336 and the transmission oil sub-system 338 via outlet 6. As can be appreciated in view of a radial position diagram map shown in FIG. 5, the second chamber 331b can be rotated to any position between about 90° and about 270° to precisely control the temperature of the coolant delivered to the engine oil sub-system 336 and the transmission oil sub-system 338.

The heater core valve 330d includes a core valve inlet in fluid communication with the output of the EGR sub-system 317 and the turbocharged sub-system 319, a first core valve outlet in fluid communication with a core inlet of the heater core 329, and a second core valve outlet in fluid communication with a heater core by-pass conduit 333. The engine controller 150 controls the operation of the heater core valve 330d between an open position and a closed position (along with intermediate positions). When fully open, high temperature coolant from the EGR sub-system 317 and the turbocharged sub-system 319 is delivered to the heater core 329. The heater core 329 transfers heat from the coolant into the vehicle cabin (not shown) via a blower unit or fan (not shown). When fully closed, the high temperature coolant by-passes the heater core 329 via the by-pass conduit 333 and is returned to the pump 302 via the return conduit 334.

Figure 6:
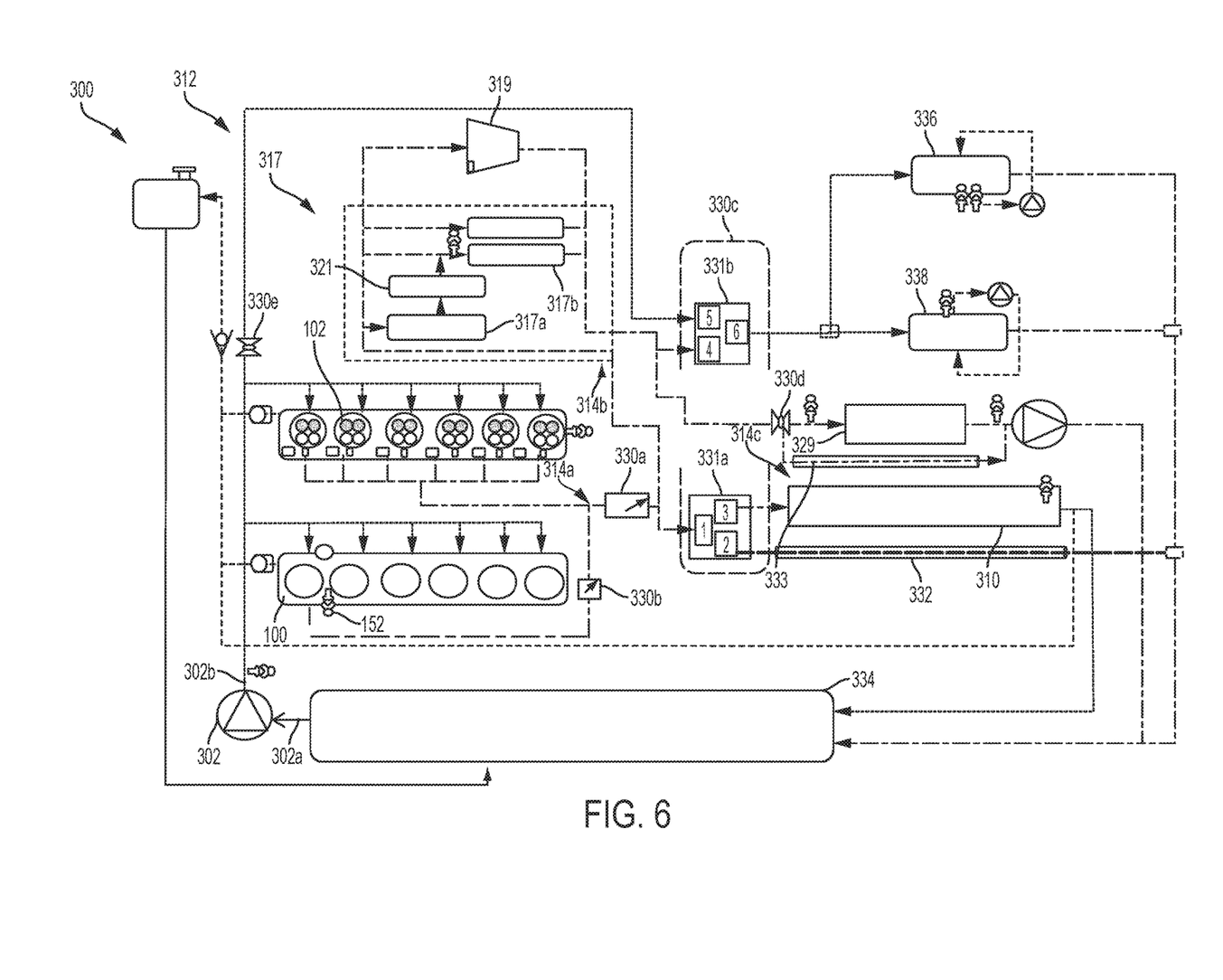
FIG. 6 is a diagram illustrating coolant flowing in the active thermal control system during a normal operating mode is according to a non-limiting embodiment.

Turning now to FIG. 6, coolant flowing in the active thermal control system 300 during a normal operating mode is illustrated according to a non-limiting embodiment. The engine controller 150 activates the normal operating mode when certain operating parameters exist. The normal operating parameters include, for example, (i) an engine outlet coolant temperature that exceeds an engine outlet coolant threshold, depending on load and/or (ii) a transmission oil temperature that is lower than a transmission oil threshold and an engine oil temperature is lower than an engine oil threshold. When the normal operating parameters are met, the engine controller 150 outputs one or more controls signals to: (a) open the flow control valve (FCV) 330a; (b) open the block valve 330b; and (c) adjust the main rotary valve 330c such that the second outlet (5) of the second chamber 331b has a greater opening compared to an opening of the first outlet (4). In at least one embodiment, the main rotary valve 330c is adjusted such that either the first inlet (4) or the second inlet (5) operates at a single time. Thus, the first inlet (4) delivers exclusively warm coolant to the EOH 336 and the TOH 338, while the second inlet (5) delivers exclusively cooled coolant (i.e., coolant have temperature less than the temperature of the coolant output from the first outlet 4) to the EOH 336 and the TOH 338.

Referring to FIG. 7, coolant flowing in the active thermal control system 300 during a "thermal increase operating mode" is illustrated according to a non-limiting embodiment. The engine controller 150 activates the "thermal increase operating mode" when thermal increase conditions exist. For example, the "thermal increase operating mode" can be invoked in response to detecting one or more of the following conditions:
(a) low or high engine flow phase;
(b) NOx aftertreatment system temperature exceeds a system temperature threshold;
(c) SCRF inlet temperature exceeds an inlet temperature threshold;
(d) transmission oil temperature exceeds a transmission oil temperature threshold and engine oil temperature exceeds an engine oil temperature threshold; and
(e) engine block temperature (e.g., temperature of the engine 100) exceeds an engine block temperature threshold.

When the engine controller 150 detects that the various temperature conditions exist, the engine controller 150 outputs one or more control signals to adjust one or more of the valves 330a-330e. For example, the FCV 330a is adjusted to an open position, the engine block valve 330b is adjusted to an open position, and the engine by-pass valve 330e is closed. The rotary valve 330c is also rotated into the transmission oil warming position. The transmission oil warming position includes adjusting the rotary valve 330c such that zero flow or approximately zero flow output from the FCV 330a is delivered to the input of the radiator 310. For instance, the main rotary valve 330c can be rotated such that the entire amount of heated coolant entering the single inlet (1) is delivered to the by-pass conduit 332 so as to completely by-pass the radiator 310. In addition, the rotary valve 330c is rotated into an oil heating position. This oil heating position includes, for example, rotating the first chamber 331a of the main rotary valve 330c such that the heat coolant output from the exhaust gas recirculation sub-system 317 and/or the turbo sub-system 319 is input to the first inlet (4) of the second chamber 331b and output from the single outlet (6) to the EOH 336 and the TOH 338. Accordingly, temperature of the coolant returned to the coolant circuit 312 is increased.

Referring to FIG. 8, coolant flowing in the active thermal control system 300 during the "thermal decrease operating mode" is illustrated according to a non-limiting embodiment. The engine controller 150 activates the "thermal decrease operating mode" when thermal decrease conditions exist. For example, the "thermal decrease operating mode" can be invoked in response to detecting the following conditions:
(a) Transmission oil temperature exceeds a transmission oil threshold temperature, or engine oil temperature exceeds an oil temperature threshold temperature.

When the engine controller 150 detects that a decrease temperature condition exists, the engine controller 150 outputs one or more control signals to adjust one or more of the valves 330a-330e. For example, the FCV 330a is adjusted to an open position, the engine block valve 330b is adjusted to an open position, and the EGR by-pass valve 330e is adjusted to an open position. The rotary valve 330c is also rotated into the transmission oil cooling position. For instance, the transmission oil cooling position includes adjusting the first chamber 331a such that heated coolant output from the FCV 330a is delivered to the input of the radiator 310. In addition, the second chamber 331b of the main rotary valve 330c is adjusted such that low temperature coolant by-passing the EGR sub-system 317 and turbocharger system 319 is input to the second inlet (5) of the main rotary valve 331b. The second chamber 331b outputs the cooled coolant from the single outlet (6) to the EOH 336 and the TOH 338 thereby reducing the temperature the coolant returned to the coolant circuit 312.

Figure 9:
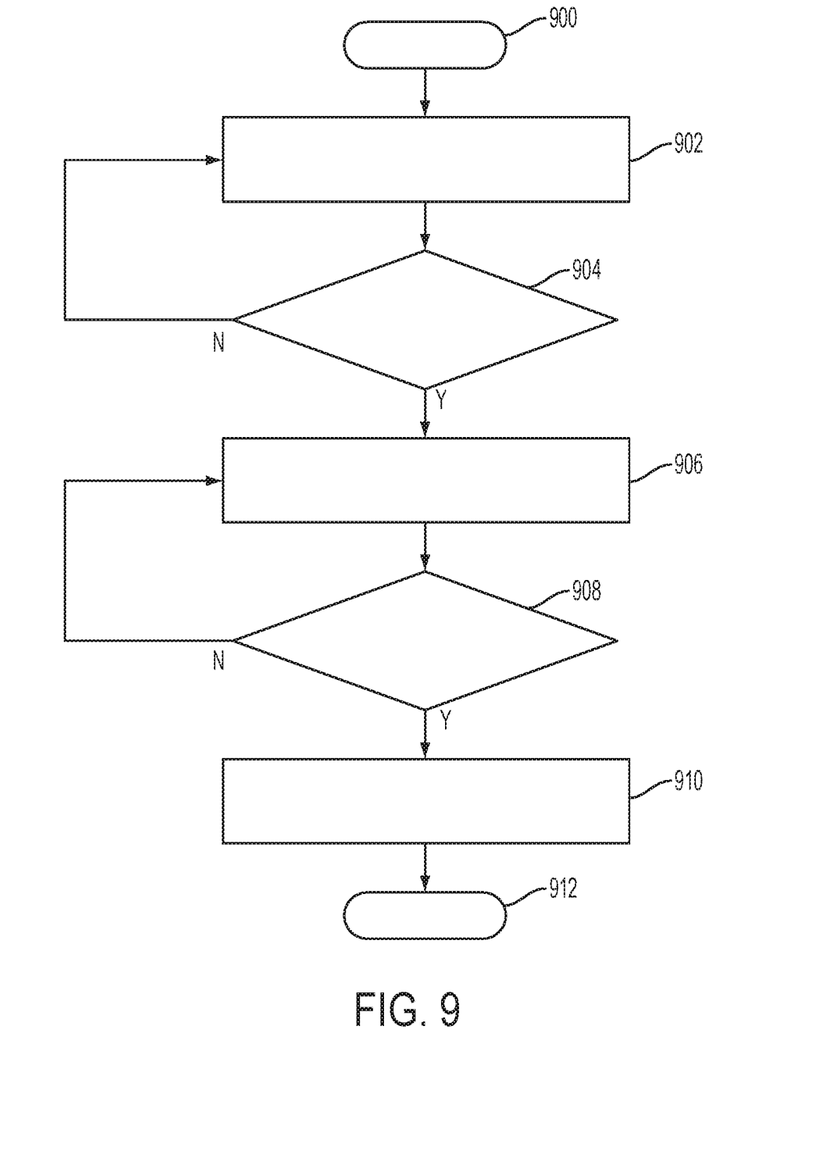
FIG. 9 is a flow diagram illustrating a method of operating an active thermal control system in a thermal increase operating mode according to a non-limiting embodiment.

Turning now to FIG. 9, a flow diagram illustrates a method of operating an active thermal control system 300 in a thermal increase mode according to a non-limiting embodiment. The method begins at operation 900 and at operation 902, the active thermal control system 300 operates in a normal operating mode. At operation 904, a comparison is performed to determine if a current temperature of an aftertreatment device such as an SRC device 204, for example, is below a temperature threshold value. When the current temperature is not below the temperature threshold value, the method returns to operation 902 and continues comparing the current temperature of the aftertreatment device(s) to the threshold temperature value. When, however, the current temperature exceeds the temperature value, the method proceeds to operation 906 and activates a thermal increase mode by adjusting one or more coolant valves 330a-330e to modify the coolant flowing through one or more coolant paths in a coolant circuit 312 of the vehicle 10. For example, the engine controller 150 of the vehicle 10 can output an electrical signal to adjust a position of the main rotary valve 330c (e.g., the first chamber 331a and the second chamber 331b) such that less coolant is delivered to the radiator 310. A decreased amount of coolant can be delivered to the radiator 310 by outputting the coolant to a by-pass conduit 332 which by-passes the radiator 310. Accordingly, the outlet temperature of the radiator 310 decreases while the overall temperature of the engine 100 and the exhaust gas increases.

Turning to operation 908, the exhaust temperature and/or the temperature of one more aftertreatment devices is compared to a temperature threshold. When the exhaust temperature and/or the temperature of one more aftertreatment devices is below the temperature threshold, the method returns to operation 906 and maintains the position of the coolant valve(s) so as to allow the exhaust gas temperature to increase. When, however, the exhaust temperature and/or the temperature of one more aftertreatment devices meets or exceeds the temperature threshold, the method proceeds to operation 910 and activates the normal operating mode by adjusting one or more one more coolant valves 330a-330e to again modify the coolant flowing through one or more coolant paths in the coolant circuit 312. For example, the engine controller 150 can output an electrical signal to adjust the position of the main rotary valve 330c (e.g., the first chamber 331a) such that more coolant is delivered to the radiator 310. An increased amount of coolant can be delivered to the radiator 310 by reducing the amount of coolant delivered to the by-pass conduit 332 and increasing the amount of coolant that is delivered to the radiator 310. Accordingly, the outlet temperature of the radiator 310 increases while the overall temperatures of the engine 100 and the exhaust gas decrease. Once activating the normal mode, the method ends at operation 912. It should also be appreciated that instead of ending at operation 912, the method can return to operation 902 to continue performing the method described above.

Figure 10:
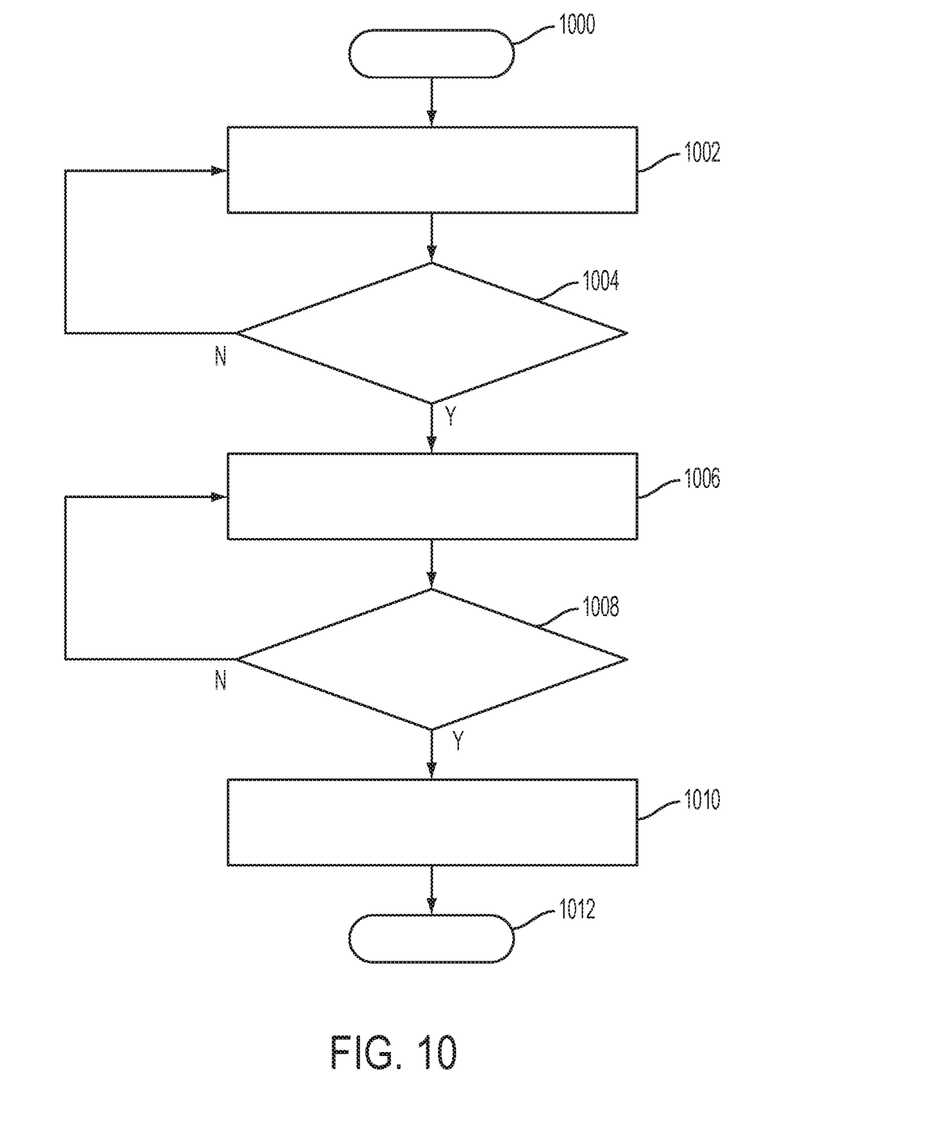
FIG. 10 is a flow diagram illustrating a method of operating an active thermal control system in a thermal decrease operating mode according to a non-limiting embodiment.

Turning now to FIG. 10, a flow diagram illustrates a method of operating an active thermal control system 300 in a thermal decrease mode according to a non-limiting embodiment. The method begins at operation 1000 and at operation 1002, the active thermal control system 300 operates in a normal operating mode. At operation 1004, a comparison is performed to determine if a current temperature of an aftertreatment device such as an SCR device 204, for example, is above a temperature threshold value. When the current temperature is not above the temperature threshold value, the method returns to operation 1002 and continues comparing the current temperature of the aftertreatment device(s) to the threshold temperature value. When, however, the current temperature is below the temperature threshold value, the method proceeds to operation 1006 and activates a thermal decrease mode by adjusting one or more one more coolant valves 330a-330e to modify the coolant flowing through one or more coolant paths in the coolant circuit 312. For example, the engine controller 150 can output an electrical signal to adjust a position of the main rotary valve 330c (e.g., the first chamber 331a) such that a greater amount of coolant is delivered to the radiator 310. An increased amount of coolant can be delivered to the radiator 310 by reducing the amount of coolant delivered to the by-pass conduit 332 thereby increasing the amount of coolant delivered to the radiator 310. Accordingly, the outlet temperature of the radiator 310 increases while the overall temperature of the engine 100 and the exhaust gas decreases.

Turning to operation 1008, the exhaust temperature and/or the temperature of one more aftertreatment devices is compared to a temperature threshold. When the exhaust temperature and/or the temperature of one more aftertreatment devices is above the temperature threshold, the method returns to operation 1006 and maintains the position of the coolant valve(s) so as to allow the exhaust gas temperature to continue decreasing. When, however, the exhaust temperature and/or the temperature of one more aftertreatment devices meets or is below the temperature threshold, the method proceeds to operation 1010 and activates the normal operating mode by adjusting one or more one more coolant valves 330a-330e to again modify the coolant flowing through one or more coolant paths in the coolant circuit of the vehicle 10. For example, the engine controller 150 of the vehicle 10 can output an electrical signal to adjust a position of the main rotary valve 330c such that less coolant is delivered to the radiator 310. A decreased amount of coolant can be delivered to the radiator 310 by directing the coolant to a by-pass conduit 332 that diverts the coolant away from the radiator 310. Accordingly, the outlet temperature of the radiator 310 decreases while the overall temperatures of the engine 100 and the exhaust gas increase. Once activating the normal mode, the method ends at operation 1012. It should also be appreciated that instead of ending at operation 1012, the method can return to operation 1002 to continue performing the method described above.

As described herein, various non-limiting embodiments include a vehicle thermal control system that provides active exhaust treatment management. The thermal management control system controls coolant flow in a coolant circuit to adjust the temperature of the exhaust gas output from the engine. In this manner, the thermal management control system can actively control exhaust gas temperatures while avoiding costly fuel consumption penalties, thereby improving overall fuel efficiency of the vehicle.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the disclosure has been described with reference to various non-limiting embodiments, it will be understood by those skilled in the art that various changes may be made and equivalents may be substituted for elements thereof. In addition, many modifications may be made to adapt a particular situation or material to the teachings of the disclosure without departing from the essential scope thereof. Therefore, it is intended that the disclosure not be limited to the particular embodiments disclosed, but that it will include all the non-limiting embodiments described herein.

What is claimed is:

1. An automotive vehicle, comprising:
   an internal combustion engine that outputs exhaust gas from at least one cylinder;
   an active thermal management system in fluid communication with the internal combustion engine, to flow coolant around the at least one cylinder thereby varying an exhaust temperature of the exhaust gas; and
   an electronic engine controller in signal communication with the internal combustion engine and the active thermal management system, the engine controller generating a control signal to selectively operate the active thermal management system in a normal mode that flows the coolant at a first coolant temperature, and a thermal increase mode that flows the coolant at a second coolant temperature greater than the first coolant temperature thereby increasing the exhaust temperature of the exhaust gas, wherein the active thermal management system further comprises an exhaust treatment system including a selective catalyst reduction (SCR) device, and wherein the engine controller activates the thermal increase mode when the SCR temperature is below a SCR temperature threshold.

2. The automotive vehicle of claim 1, wherein the exhaust treatment system further comprises a particular filter (PF) device, and wherein the engine controller activates the thermal increase mode based further on at least one of, a PF pressure of the PF device, and a temperature of the PF device.

3. The automotive vehicle of claim 2, wherein the engine controller activates the thermal increase mode when the PF pressure exceeds a PF pressure threshold.

4. The automotive vehicle of claim 3, wherein particulate matter loaded in the PF device is combusted in response to increasing the exhaust temperature thereby regenerating the PF device.

5. The automotive vehicle of claim 2, wherein the active thermal management system further comprises a coolant circuit having a plurality of individual flow paths that are selectively enabled via at least one coolant valve.

6. The automotive vehicle of claim 5, wherein the engine controller adjusts the at least one coolant valve to a first position that directs the coolant through a first flow path among the plurality of individual flow paths thereby activating the normal mode, and adjusts the at least one coolant valve to a second position that directs the coolant through a second flow path among the plurality of individual flow paths different from the first flow path thereby activating the thermal increase mode.

7. An automotive vehicle, comprising:
an internal combustion engine that outputs exhaust gas from at least one cylinder;
an active thermal management system in fluid communication with the internal combustion engine to flow coolant around the at least one cylinder thereby varying an exhaust temperature of the exhaust gas; and
an electronic engine controller in signal communication with the internal combustion engine and the active thermal management system, the engine controller generating a control signal to selectively operate the active thermal management system in a normal mode that flows the coolant at a first coolant temperature, and a thermal decrease mode that flows the coolant at a second coolant temperature less than the first coolant temperature thereby decreasing the exhaust temperature of the exhaust gas,
wherein the active thermal management system further comprises an exhaust treatment system comprising at least one of a selective catalyst reduction (SCR) device and a particular filter (PF) device, and wherein the engine controller activates the thermal decrease mode based on at least one of a SCR temperature of the SCR device and a PF temperature of the PF device.

8. The automotive vehicle of claim 7, wherein the engine controller activates the thermal decrease mode when the SCR temperature exceeds a SCR temperature threshold.

9. The automotive vehicle of claim 7 wherein the engine controller activates the thermal decrease mode when at least one of the PF temperature exceeds a PF temperature threshold.

10. The automotive vehicle of claim 7, wherein the active thermal management system further comprises a coolant circuit having a plurality of individual flow paths that are selectively enabled via at least one coolant valve.

11. The automotive vehicle of claim 10, wherein the engine controller adjusts the at least one coolant valve to a first position that directs the coolant through a first flow path among the plurality of individual flow paths thereby activating the normal mode, and adjusts the at least one coolant valve to a second position that directs the coolant through a second flow path among the plurality of individual flow paths different from the first flow path thereby activating the thermal decrease mode.

12. A method of controlling an active thermal management system of a vehicle, the method comprising:
outputting exhaust gas from at least one cylinder of an internal combustion engine included in the vehicle;
flowing coolant around the at least one cylinder to vary an exhaust temperature of the exhaust gas;
operating the active thermal management system in a normal mode that flows the coolant at a first coolant temperature based on a first operating parameter; and
selectively operating the active thermal management system in a thermal decrease mode that flows the coolant at a third temperature that is less than the first coolant temperature and the second coolant temperature based on a third operating parameter thereby decreasing the exhaust temperature of the exhaust gas.

13. The method of claim 12, further comprising activating the thermal increase mode based on at least one of a SCR temperature of the SCR device, a PF pressure of the PF device and a temperature of the PF.

14. The method of claim 13, further comprising activating the thermal increase mode when the SCR temperature is below a SCR temperature threshold.

15. The method of claim 13, further comprising activating the thermal increase mode when the PF pressure exceeds a PF pressure threshold.

16. The method of claim 13, further comprising selectively enabling a plurality of individual flow paths defining a coolant circuit of the vehicle in response to adjusting at least one coolant valve.

17. The method of claim 16, further comprising adjusting the at least one coolant valve to a first position that directs the coolant through a first flow path among the plurality of individual flow paths thereby activating the normal mode, and adjusting the at least one coolant valve to a second position that directs the coolant through a second flow path among the plurality of individual flow paths different from the first flow path thereby activating the thermal increase mode.

* * * * *